June 3, 1930.  J. ROBINSON  1,762,032
AUTOMATIC TRAIN PIPE COUPLING
Original Filed July 1, 1921   2 Sheets-Sheet 2
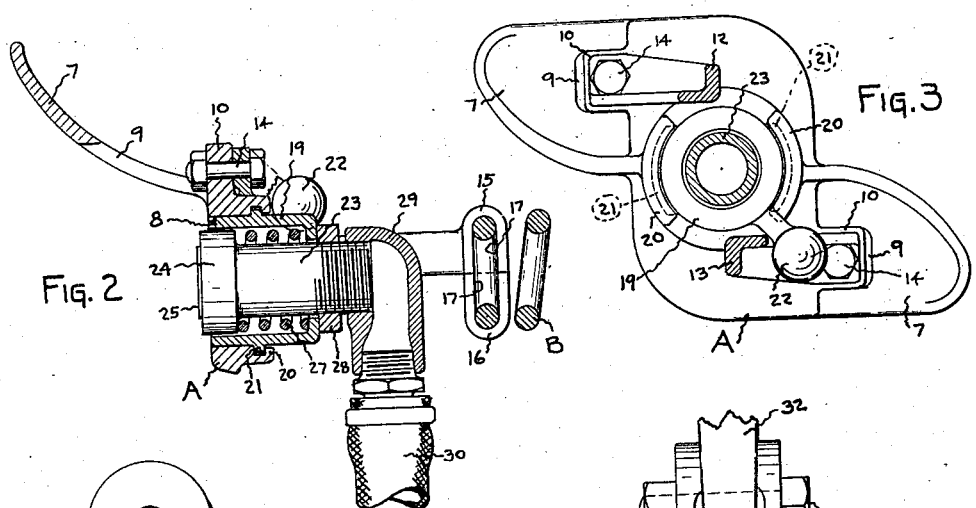
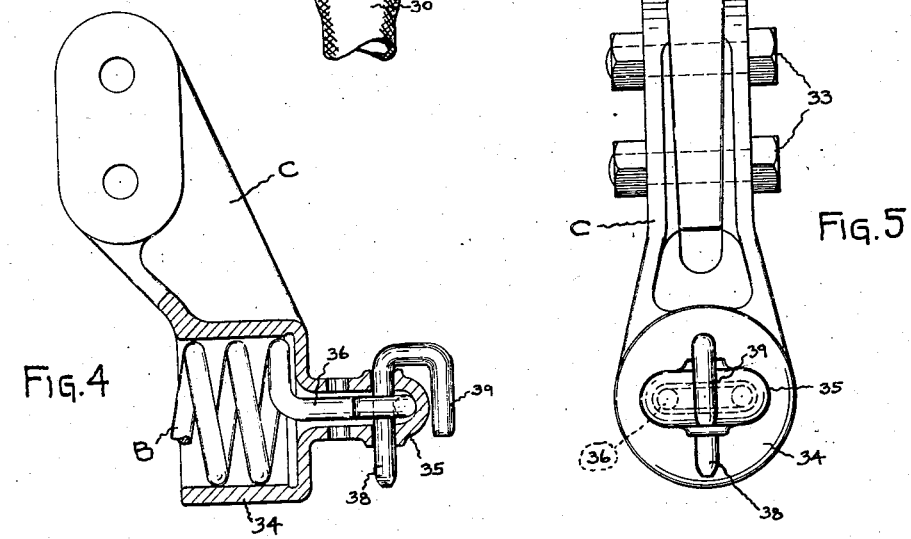
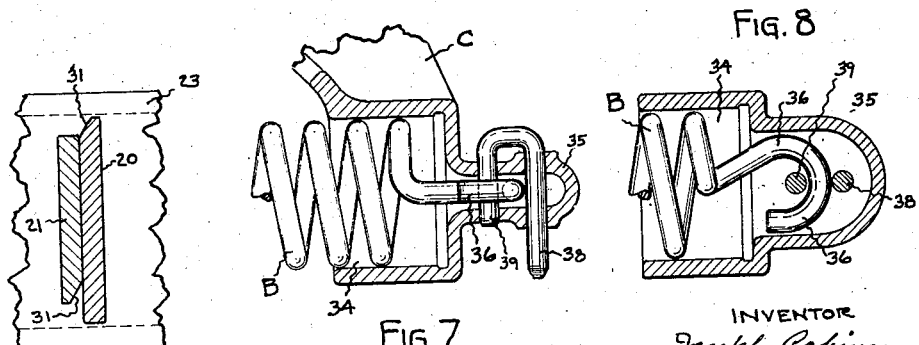

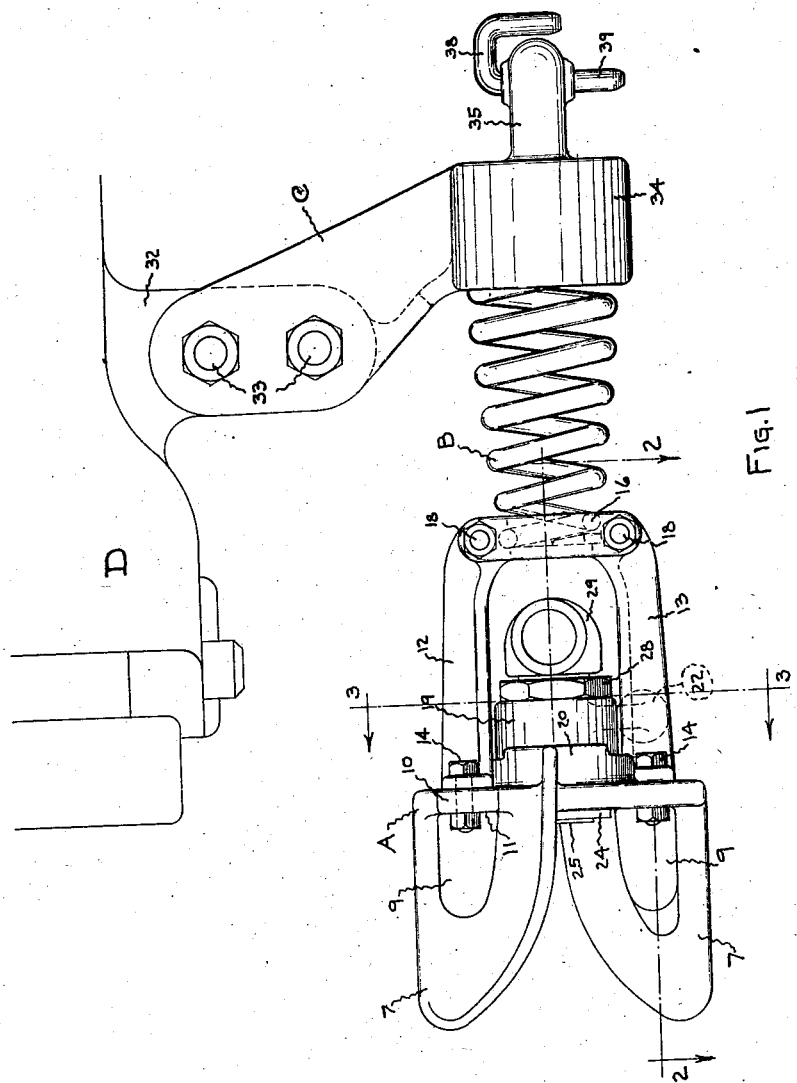

Patented June 3, 1930

1,762,032

UNITED STATES PATENT OFFICE

JOSEPH ROBINSON, OF NEW YORK, N. Y.

AUTOMATIC TRAIN-PIPE COUPLING

Application filed July 1, 1921, Serial No. 481,964. Renewed October 2, 1928.

This invention relates to automatic train pipe couplings, and the object is to improve the coupling head thereof and the means for supporting the head. It is frequently found desirable in service to adjust the coupling head forward of its supporting bracket to compensate for the wear occurring on the car coupler knuckle. The designs heretofore offered for this purpose have been found uncertain in operation and prohibitively expensive to manufacture to proper dimensions. This is especially true of those constructions in which the supporting spring is adjustably threaded through the bracket. On account of the variation in the bracket casting and the spring diameter, inherent to their commercial manufacture, these parts will invariably not assemble properly. When by hand fitting or other expensive operation they are satisfactorily assembled, rust obstructs the free adjustment of the spring in the bracket and defeats the end aimed at. Moreover, with this type of support the serious objection applies that the several train pipe hose must be disconnected from the coupling head and the head turned a complete revolution in order to effect adjustment. One object of my invention is to remove this difficulty.

Another object is to provide for the removal of a defective gasket from between mated coupling heads having a reciprocal conduit backed up by a compression spring.

I attain these and other objects by the constructions, combinations, and arrangements hereinafter described, pointed out in the appended claims, and illustrated in the accompanying drawings in which:

Figure 1 is a side elevation of my improvement.

Figure 2 is a sectional plan view through the coupling head and spring on the line 2—2 of Figure 1.

Figure 3 is a rear view of the coupling head and parts on the line 3—3 of Figure 1.

Figure 4 is a vertical section through the bracket C showing my improved adjusting means.

Figure 5 is a rear view of the structure shown in Figure 4.

Figure 6 is a detail view showing the shape of the ends of the interlocking lugs 20 and 21.

Figure 7 is a detail sectional view showing my improved support in the adjusted position, and Figure 8 is a detail of Figure 7 showing in sectional plan view the means by which the spring B is anchored to the bracket.

Referring now to the drawings: My improvement comprises a coupling head A of any suitable form, preferably of the type having a pair of diagonally spaced, forwardly extending, outwardly diverging guiding prongs 7, and a centrally located aperture 8. I provide the prongs with an opening 9 cast therein, and in line with this opening and radiating from opposite sides of the head A I provide lugs 10, the openings 9 being located in front of these lugs, and somewhat larger than the lugs, to permit the sand to draw away from the inner face 11 of the lugs in molding. This greatly facilitates manufacture of the coupling head and materially reduces the production cost thereof, by eliminating the use of a core at this point.

Spanning the opening 8 in the head I provide a pair of arms or anchors 12 and 13 which when connected together form a yoke. The arms are suitably secured to the lugs 10 as by bolts 14, and extend inwardly to the vertical central plane of the head A and rearwardly in such plane, as shown especially in Figure 3. At their rear ends the arms terminate in vertically disposed portions or jaws 15 and 16 each having a groove 17 conforming to the shape of the end coil or coils of the supporting spring B, the jaws 15 and 16 forming, when secured together by the bolts 18, a clamp in which the forward end or apex of the spring B is rigidly locked or anchored.

In the centrally located opening 8 of the coupling head A, and between the arms 12 and 13, I removably mount a hollow sleeve or container 19, the same being held in position in the head by co-operating lugs 20 and 21 formed on the head and sleeve respectively, as appears particularly in Figure 3. To rotate the lugs 21 of the sleeve behind the dogs or lugs 20 of the coupling head A, I provide the sleeve with a weighted handle 22 adapted normally to rest against the arm 13 and thus properly position the sleeve 19 and maintain it in such position. Slidably mounted in the sleeve I provide a conduit 23 having an enlarged forward end 24 carrying a gasket 25. Surrounding the sleeve and confined between said enlarged end and the shoulder or flange 26 of the sleeve 19 I provide a compression spring 27 which tends to project the conduit 23 forward of the sleeve and of the coupling face of the head A and maintain mated gaskets 25 in air tight connection regardless of relative movement between the coupling heads A. To maintain the conduit in the sleeve, with the spring 27 preferably under compression, and to vary the extent of projection of the conduit forward of the face of the coupling head A, I provide an adjusting nut 28 threaded to the rear end of the conduit and adapted to bear against the rear face of the sleeve 19 as shown. Behind this nut I mount an elbow or other suitable fitting 29 to which the usual train pipe hose 30, Figure 2, is suitably connected. The hose, and the entire terminal therefore comprising the sleeve 19, the conduit 23 and the spring 27, may be readily disconnected from the coupling head A by simply lifting up on the handle 22 until the lugs 21 are rotated out of engagement with the lugs 20. The reverse of this operation will reassemble the parts. In this way a defective gasket 25 may be removed and replaced while a pair of the coupling heads A remain coupled, the lugs 20 and 21 being tapered at 31, Figure 6, to thrust the sleeve forward and compress the spring 27 as the handle 22 is rotated downwardly in assembling the sleeve in one of a pair of coupled heads.

My improved support for the coupling head A comprises the aforesaid supporting or buffer spring B, and a bracket C. The upper end of the bracket is forked and spans a lug 32 of the car coupler D, to which lug the bracket is suitably connected as by bolts 33. A chamber 34 is formed at the lower end of the bracket and from this chamber, and centrally located with respect thereto, a neck or hollow stem 35 extends within the chamber 34 the base or rear end of the spring B is adjustably mounted, the inside diameter of the chamber being such as to closely receive this end of the spring and prevent excessive angular movement of the same therein when the coupling head moves to extreme positions. It will be observed that the diameter of each coil of the spring varies, save for the last few coils at the base end of the spring. These have a common diameter, and a common thickness in cross section. They terminate in a U shaped link or anchor portion 36, Figures 4 and 8, which extends into the hollow stem 35 of the bracket C and abuts the rear wall 37 of such stem. A bolt 38 extends downwardly through aligned openings in the stem 35 and through the link 36 and served to anchor the spring in the bracket. When it is desired to adjust the coupling head A forward of the bracket the bolt 38 is removed and the spring B is shifted forward in the chamber 34 until it occupies the position shown in Figures 7 and 8 and whereupon the bolt is replaced with its bent portion 39 embracing the rear end of the link 36 to anchor the spring in the adjusted position, the weight of the portion 39 serving also to maintain the bolt in place. While provision for but one adjustment is shown more may, of course, be had by increasing the number of adjustment holes for the bolt 38.

It will be observed that the thickness of the metal from which each coil of the spring B is formed, save the last few base coils, varies. This with the conical formation of the forward and major portion of the spring, and the cylindrical formation of the rear portion thereof, produces a supporting spring having special and highly desirable features. It affords, for example, a variable resistance to all movements of the coupling head A, which resistance increases in greater progression than the extent of such movement, and minimizes the destructive effects of the coupling shocks to which the connector is subjected in service. The construction also prevents localization of stresses in any one or a few of the spring coils. The spring constitutes the side support for the coupling head A and is of sufficient strength to properly maintain the head in the normal horizontal position, and to properly back up the spring 27 and compress the gasket 25. The rigid connection between the coupling head and the apex of the spring, and the non-rotatable engagement of the link 36 with the portion 35 of the bracket C, maintains the coupling head in its proper vertical position and causes the spring to yieldingly resist all rotative movements of the head. While I show but one conduit 23 more, may of course, be provided if desired. For passenger service three of these conduits would be required, and it would be advisable to align them vertically in the coupling head A.

What I claim is:

1. In an automatic train pipe coupling, the combination of a coupling head having an opening therein and having also a pair of perforated guides, a spring for supporting said head, a yoke comprising separate members which straddle the opening in said head and which are connected to the head in alignment with the perforations in said guides, said yoke being suitably connected to one end of said spring, and a bracket connected to the other end of said spring and serving to support said coupling head from the car.

2. In an automatic train pipe coupling, the combination of a coupling head having guides each provided with an opening, a lug extending from a side of the head in alignment with the opening in each of said guides, a spring for supporting the head, a yoke secured to said lugs and serving to connect one end of the spring to said head, and a bracket connected to the other end of said spring.

3. In an automatic train pipe coupling, the combination of a coupling head, a bracket having a hollow portion, and a spring for supporting said head, said spring being slidably mounted in the hollow portion of said bracket and means engaging the said bracket and the inner end of said spring to secure the spring to the bracket in a plurality of different positions.

4. In an automatic train pipe coupling, the combination of a coupling head, a bracket having a hollow portion, a spring for supporting said head, said spring being adapted to be adjusted forward or backward in said hollow portion without rotating the spring, and means for locking the inner end of said spring against movement in either direction relative to the bracket after the same has been adjusted.

5. In an automatic train pipe coupling, the combination of a coupling head, a bracket having an opening therein, a spring mounted in said opening and serving to support said head, said spring having an elongated projection extending into said opening to permit the spring to be adjusted forward of the bracket, and means engaging said elongated portion and a part of the bracket to anchor the spring against movement in either direction in the bracket.

6. In an automatic train pipe coupling, the combination of a coupling head, a bracket having an opening therein, a spring for supporting said head, one end of which spring terminating in a link that extends into the opening in said bracket, and a member passing through a wall of said bracket and through said link to anchor said spring in the bracket.

7. In an automatic train pipe coupling, the combination of a coupling head, a bracket having an opening at its lower end and having also an elongated way leading from said opening, a spring for supporting said head, said spring being mounted in said opening and having a portion extending into said way, and means projecting into said way and into engagement with said portion to adjustably anchor said spring in said opening.

8. In an automatic train pipe coupling, the combination of a coupling head, a bracket having an opening and having also an elongated way leading from said opening, a spring having one end mounted in said opening and having a link extending into said way, said spring serving to support said head, and a pin provided with a bent end adapted to embrace the rear end of said link to anchor said spring in the opening in said bracket.

9. In an automatic train pipe coupling, the combination of a coupling head, a bracket having at its lower end an elongated way, and a spring for supporting said head, said spring being provided with a U-shaped portion extending into said elongated way to anchor the spring to the bracket and to prevent rotation of the spring relative to the bracket.

10. In an automatic train pipe coupling, the combination of a coupling head, a bracket having at its lower end a chamber, and a spring for supporting said head, said spring having a conical shaped forward section and a cylindrically shaped rear section, the conical section of said spring being connected to said coupling head and the cylindrically shaped section being adjustable in said chamber without rotating the spring, and means to secure said spring in a plurality of different positions in said chamber.

11. In an automatic train pipe coupling, the combination of a coupling head, a bracket having an opening therein, a coiled spring for supporting said head, the coils of one end of said spring being mounted in the opening in said bracket and being free to deflect upon compression of said spring, and means to anchor said spring to said bracket and to permit adjustment thereof forward of the bracket.

12. In an automatic train pipe coupling, a coupling head having an opening extending therethrough, a sleeve mounted in said opening, a fitting slidably mounted in said sleeve, a spring arranged in said sleeve and bearing at one end against said fitting and at the other end against said sleeve, said fitting extending through an opening in said sleeve and having a nut adjustably mounted thereon externally of the sleeve, cooperating lugs on said sleeve and head adapted to be brought into engagement by partial rotation of the sleeve in said opening, whereby said sleeve may be removed from said opening by partial rotation of the same, and means to prevent turning said sleeve through more than a partial rotation in the head.

13. In an automatic train pipe coupling, a coupling head having an opening extending therethrough, a sleeve mounted in said opening, a fitting slidably mounted in said sleeve, a spring arranged in said sleeve and bearing at one end against said fitting and at the other end against said sleeve, said fitting extending through an opening in said sleeve and having a nut adjustably mounted thereon externally of the sleeve, cooperating lugs on said sleeve and head adapted to be brought into engagement by partial rotation of the sleeve in said opening, whereby said sleeve may be removed from said opening by partial rotation of the same.

14. In an automatic train pipe coupling, a coupling head having an opening, a sleeve mounted in said opening and readily removable therefrom, a fitting slidably mounted in said sleeve, said sleeve being insertable into and removable from said opening without rotating the same, cooperating locking portions on said sleeve and head adapted to be brought into engagement for locking said sleeve in said opening, and means to prevent turning said sleeve through more than a partial rotation in the head.

In testimony whereof I affix my signature.

JOSEPH ROBINSON.